US009982753B1

(12) United States Patent
Hsu

(10) Patent No.: US 9,982,753 B1
(45) Date of Patent: May 29, 2018

(54) HOUSING-ROTATABLE PLANETARY GEAR REDUCER FOR STAND MIXER

(71) Applicant: ANJET MACHINERY CO., LTD, Taipei (TW)

(72) Inventor: Wen-Chang Hsu, Taipei (TW)

(73) Assignee: ANJET MACHINERY CO., LTD., Taipei (TW)

( * ) Notice: Subject to any disclaimer, the term of this patent is extended or adjusted under 35 U.S.C. 154(b) by 0 days. days.

(21) Appl. No.: 15/480,570

(22) Filed: Apr. 6, 2017

(51) Int. Cl.
  *F16H 1/46* (2006.01)
  *A47J 43/07* (2006.01)
  *F16H 57/029* (2012.01)

(52) U.S. Cl.
  CPC ............... *F16H 1/46* (2013.01); *A47J 43/07* (2013.01); *F16H 57/029* (2013.01)

(58) Field of Classification Search
  None
  See application file for complete search history.

(56) References Cited

U.S. PATENT DOCUMENTS

| 2005/0040265 | A1* | 2/2005 | Pai | A47J 43/255 |
| | | | | 241/169.1 |
| 2005/0085324 | A1* | 4/2005 | Christ | F16H 1/28 |
| | | | | 475/5 |
| 2005/0282678 | A1* | 12/2005 | Mundis | B66C 23/84 |
| | | | | 475/269 |
| 2009/0057452 | A1* | 3/2009 | Tang | A47J 42/46 |
| | | | | 241/169.1 |
| 2013/0264405 | A1* | 10/2013 | Audette | A47J 43/0722 |
| | | | | 241/277 |
| 2015/0265088 | A1* | 9/2015 | Thomas | A47J 19/04 |
| | | | | 241/89.1 |
| 2016/0156248 | A1* | 6/2016 | Lueker | H02K 7/116 |
| | | | | 310/83 |
| 2016/0256006 | A1* | 9/2016 | Dickson, Jr. | B01F 15/00201 |
| 2016/0377162 | A1* | 12/2016 | Ziskovsky | F16H 57/02 |
| | | | | 475/337 |

* cited by examiner

*Primary Examiner* — Ramya P Burgess
*Assistant Examiner* — Timothy Hannon
(74) *Attorney, Agent, or Firm* — WPAT, PC

(57) ABSTRACT

A housing-rotatable planetary gear reducer for stand mixer includes an immovable second planetary carrier and a rotatable second ring gear fixedly locked to a housing of the planetary gear reducer. Power from a motor is transmitted to the rotatable second ring gear and output via the housing, to which a mixer shaft is connected. The housing of the housing-rotatable planetary gear reducer is fully sealed and oil-leakproof, provided a lubricant oil level inside the planetary gear reducer is not higher than a normal oil level. Further, the housing-rotatable planetary gear reducer includes two tapered roller bearings arranged at a highest and a lowest position on the housing to provide two sufficiently spaced and stable support points capable of bearing axial and radial forces from the rotating mixer shaft. Therefore, lengthened support base and coupling can be omitted to enable reduced manufacturing cost, weight and volume of the planetary gear reducer.

4 Claims, 7 Drawing Sheets

HOUSING-ROTATABLE PLANETARY GEAR REDUCER FOR STAND MIXER

FIELD OF THE INVENTION

The present invention relates to a housing-rotatable planetary gear reducer for stand mixer, in which a motor transmits power to a rotatable housing of the reducer for outputting the power and bringing a mixer shaft fixedly connected to the housing to rotate. With these arrangements, the planetary gear reducer is oil-leakproof and can better bear axial and radial forces from the operating mixer shaft.

BACKGROUND OF THE INVENTION

A conventional vertical planetary gear reducer for a mixer usually includes a fixed ring gear and a rotatable planetary carrier, so that power is output from an output shaft mounted on the planetary carrier. The planetary gear reducer with the above structure requires an oil seal mounted on the output shaft to prevent an oil leak of the planetary gear reducer. When the planetary gear reducer has been used over a long period of time, the material forming the oil seal tends to become aged and a position on the output shaft in contact with the oil seal will be worn out to cause an oil leak. The leaked oil will contaminate materials being mixed.

When the conventional planetary gear reducer is used with a stand mixer, the oil leaked from the reducer will seriously contaminate the products being mixed and accordingly results in big losses to the manufacturers of the mixed products. Even though some reliable and relatively expensive mechanical oil seals (e.g. floating seals) have been used in some advanced planetary gear reducers, the condition of oil leak still exists and could not be thoroughly overcome. In the case the materials to be mixed include food or medicine, the oil leak of the planetary gear reducer will cause even more serious adverse results.

FIG. 1 is a schematic structural view of a conventional vertical planetary gear reducer, which includes a motor 10, a gearbox 11, a coupling 12, and an output shaft 13. The gearbox 11 has a planetary gear reducing mechanism (not shown) received therein. The coupling 12 couples a power output shaft 14 of the gearbox 11 to the output shaft 13, so that power is output via the output shaft 13. For the output shaft 13 to have good radial pressure resistance, two bearings 15, 16 mounted around the output shaft 13 should not be located too close to each other. Therefore, a support base 17 for supporting the two bearings 15, 16 must also be long enough to cover the long distance between the two bearings 15, 16. With this structure, the whole planetary gear reducer will have a relatively large overall length, and an oil seal 18 mounted on the output shaft 13 tends to be worn out and cause an oil leak when the output shaft 13 has been used over a long period of time.

SUMMARY OF THE INVENTION

A primary object of the present invention is to provide a housing-rotatable planetary gear reducer for stand mixer, which includes an immovable second planetary carrier and a rotatable second ring gear fixedly connected to a housing of the planetary gear reducer, so that power from a motor is transmitted to the rotatable second ring gear and output via the housing, to which a mixer shaft is fixedly connected.

Another object of the present invention is to provide a housing-rotatable planetary gear reducer for stand mixer that is oil-leakproof and has reduced parts and components to enabled reduced manufacturing cost thereof.

A further object of the present invention is to provide a housing-rotatable planetary gear reducer for stand mixer that has improved ability to bear axial and radial forces from the rotating mixer shaft of the mixer.

To achieve the above and other objects, the housing-rotatable planetary gear reducer for stand mixer according to a preferred embodiment of the present invention includes a locating flange, a first planetary gear set, a first sun gear, a second planetary gear set, a second sun gear and a housing. A mixer shaft is connectable to the housing. The first planetary gear set includes a first ring gear fixedly connected to the locating flange. The first sun gear is driven by a motor to rotate and transmits power from the motor to the first planetary gear set for it to rotate. Then, via the second sun gear, the first planetary gear set transmits power to the second planetary gear set for it to rotate. A second planetary carrier of the second planetary gear set is fixedly connected to a connecting plate, which is further fixedly connected to the first ring gear of the first planetary gear set to form an integral body, so that the second planetary carrier is fixed and immovable. The housing includes an upper barrel portion and a lower cup portion. A second ring gear of the second planetary gear set is clamped to between the upper barrel portion and the lower cup portion of the housing, and the upper barrel portion, the second ring gear and the lower cup portion are locked together by means of a plurality of screws. Sealants are applied to a joint of the upper barrel portion and the second ring gear as well as a joint of the second ring gear and the lower cup portion. Therefore, when the motor operates, the housing is driven to rotate at a reduced rotational speed.

An extended shaft is connected to a bottom center of the second planetary carrier. A first tapered roller bearing is disposed between the upper barrel portion of the housing and the first ring gear of the first planetary gear set. A second tapered roller bearing and a roller bearing are disposed between the lower cup portion of the housing and the extended shaft at the bottom center of the second planetary carrier with the second tapered roller bearing located below the roller bearing. The first and the second tapered roller bear form an upper and a lower rotation support point on the housing, respectively.

The mixer shaft has a horizontal connecting plate provided on an upper end thereof; and the horizontal connecting plate is fixedly locked to a bottom surface of the lower cup portion of the housing by means of a plurality of screws. A flat key is clamped to between the bottom surface of the lower cup portion of the housing and the horizontal connecting plate of the mixer shaft; such that an upper part of the flat key is set in a receiving recess preformed on the bottom surface of the lower cup portion and a lower part of the flat key is set in another receiving recess preformed on a top surface of the horizontal connecting plate of the mixer shaft.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figures 1, 2:
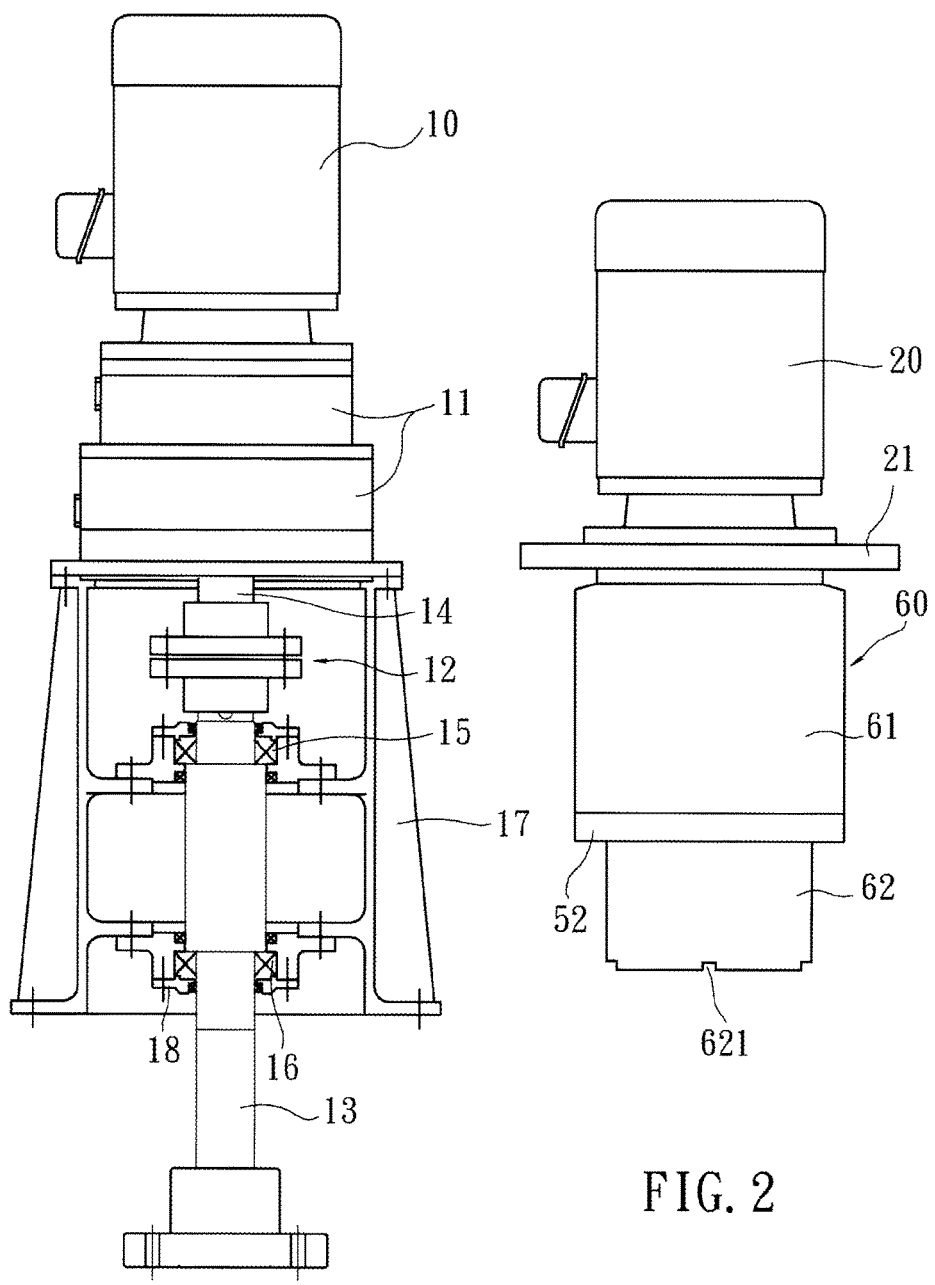
FIG. 1 is a schematic structural view of a conventional vertical planetary gear reducer.
FIG. 2 is a side view of a housing-rotatable planetary gear reducer for stand mixer according to a preferred embodiment of the present invention.
Figure 3:
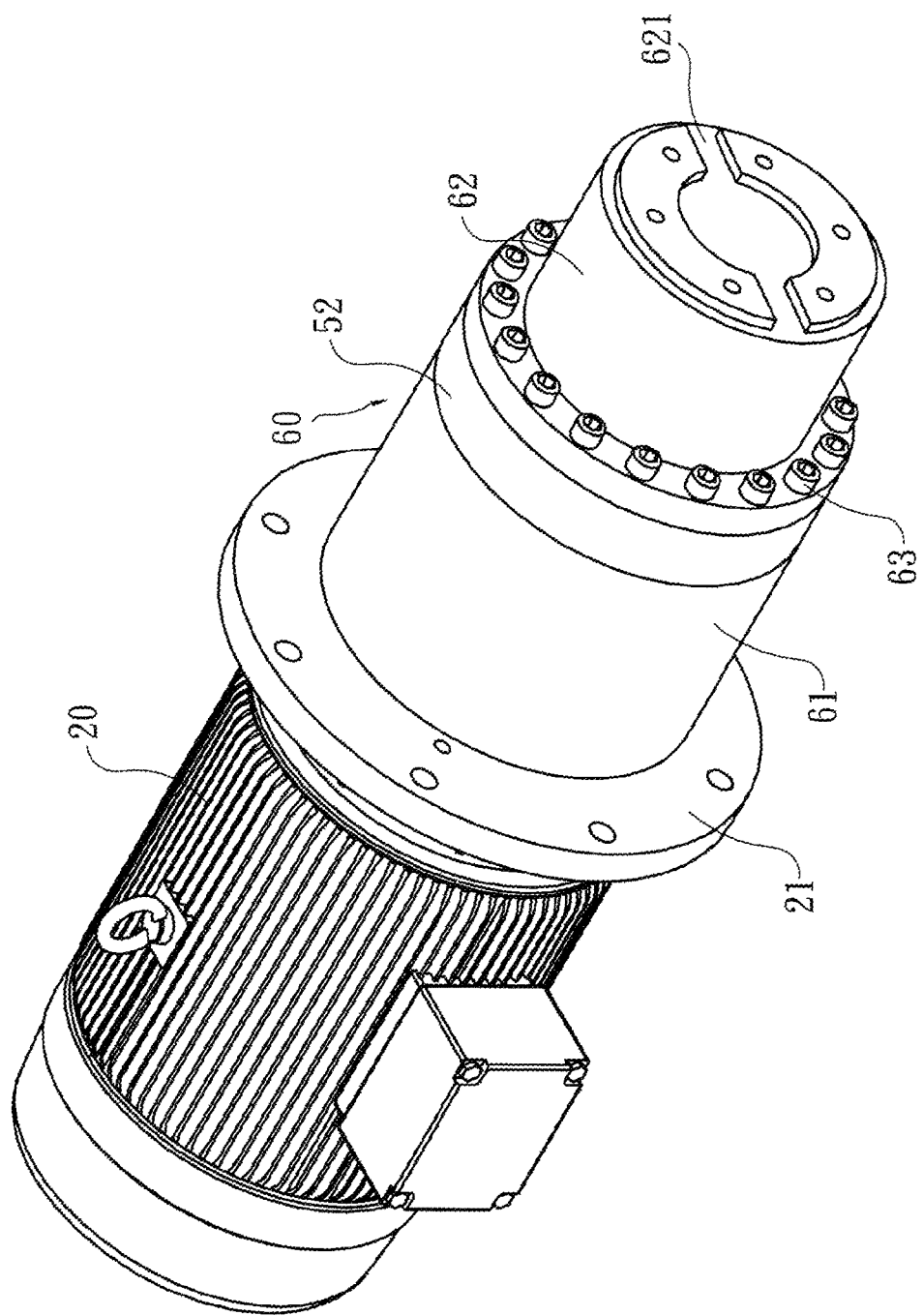
FIG. 3 is an assembled perspective view of the housing-rotatable planetary gear reducer for stand mixer according to the preferred embodiment of the present invention.

Please refer to FIGS. 2 through 6, in which a housing-rotatable planetary gear reducer for stand mixer according to a preferred embodiment of the present invention is shown. For the purpose of conciseness, the present invention is herein also briefly referred to as the housing-rotatable planetary gear reducer, which includes a locating flange 21, a first planetary gear set 30, a first sun gear 31, a connecting plate 40, a second planetary gear set 50, a second sun gear 51, and a housing 60.

Figure 4:
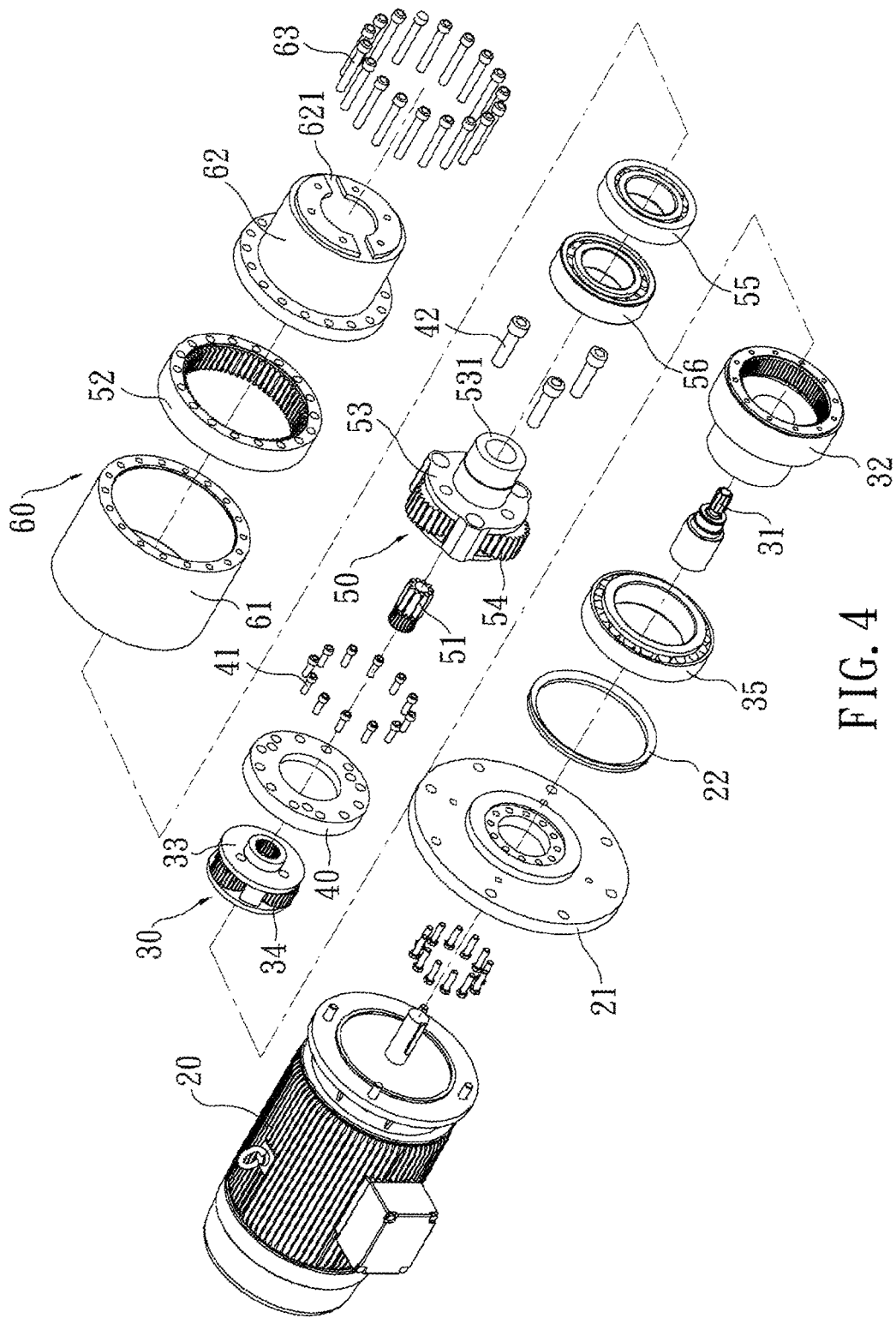
FIG. 4 is an exploded perspective view of FIG. 3.
Figure 5:
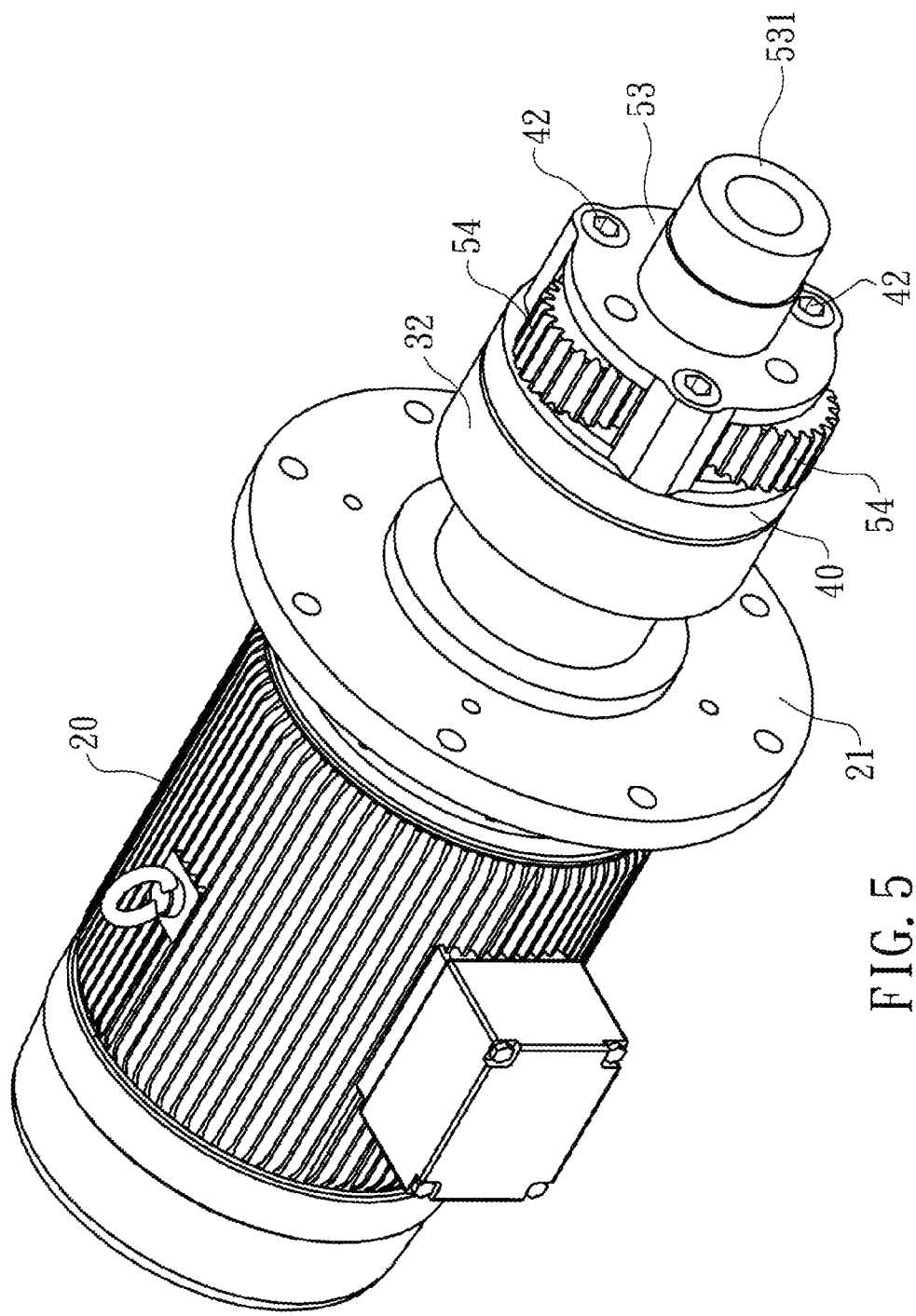
FIG. 5 is similar to FIG. 3 but a housing of the housing-rotatable planetary gear reducer is removed therefrom.

The first planetary gear set 30 includes a first ring gear 32, a first planetary carrier 33, and a plurality of planetary gears 34 mounted on the first planetary carrier 33. In FIG. 4, three planetary gears 34 are shown. The first ring gear 32 is fixedly connected to the locating flange 21 to form an integral body. The first sun gear 31 is driven by a motor 20 to rotate and accordingly transmits power to the three planetary gears 34 mounted on the first planetary carrier 33 for them to rotate. Wherein, the first ring gear 32 is fixed in place and immovable while the first planetary carrier 33 enables a first reduction of rotational speed.

The second planetary gear set 50 includes a second ring gear 52, a second planetary carrier 53, and a plurality of planetary gears 54 mounted on the second planetary carrier 53. In FIG. 4, three planetary gears 54 are shown. Via the second sun gear 51, the first planetary carrier 30 transmits power to the planetary gears 54 mounted on the second planetary carrier 53. The second planetary carrier 53 is fixedly mounted to the connecting plate 40 by means of a plurality of screws 42; and the connecting plate 40 is further fixedly connected to the first ring gear 32 of the first planetary gear set 30 by means of a plurality of screws 41. Wherein, the second planetary carrier 53 is fixed in place and immovable while the second ring gear 52 enables a second reduction of rotational speed.

Figure 6:
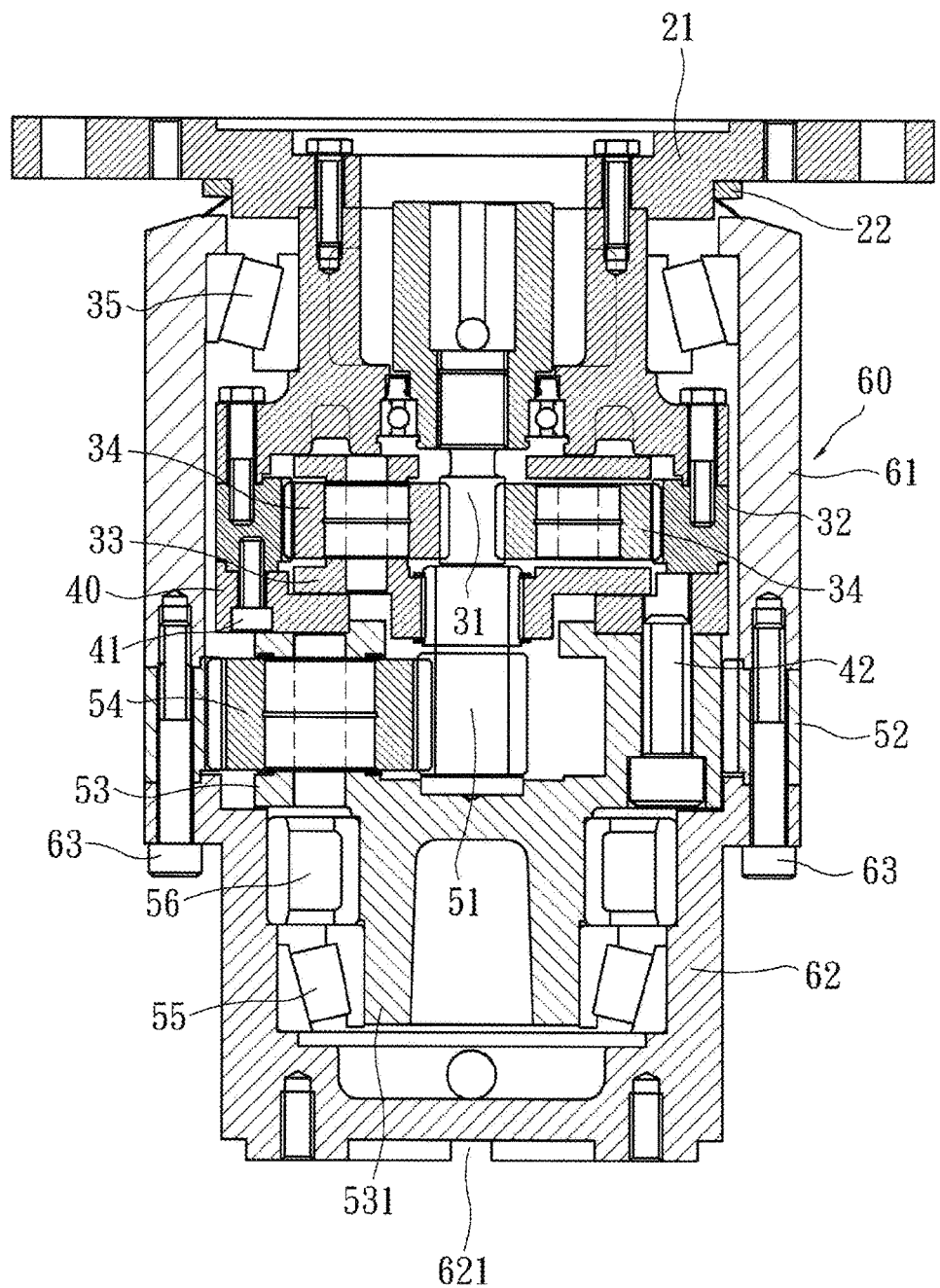
FIG. 6 is an assembled sectional view of the housing-rotatable planetary gear reducer for stand mixer according to the preferred embodiment of the present invention.

Please refer to FIGS. 4 and 6 at the same time. The housing 60 includes an upper barrel portion 61 and a lower cup portion 62. The second ring gear 52 of the second planetary gear set 50 is clamped to between the upper barrel portion 61 and the lower cup portion 62. The upper barrel portion 61, the second ring gear 52 and the lower cup portion 62 are sequentially locked together by means of a plurality of screws 63. Sealants are applied to a joint of the upper barrel portion 61 and the second ring gear 52 and a joint of the second ring gear 52 and the lower cup portion 62, so that the housing 60 is oil-leakproof.

The second planetary carrier 53 has an extended shaft 531 connected to a lower center thereof. The extended shaft 531 has a lower half, which is diametrically smaller than an upper half of the extended shaft 531. A first tapered roller bearing 35 is disposed between the upper barrel portion 61 of the housing 60 and the first ring gear 32 of the first planetary gear set 30. A second tapered roller bearing 55 and a roller bearing 56 are disposed between the lower cup portion 62 of the housing 60 and the extended shaft 531 of the second planetary carrier 53 with the second tapered roller bearing 55 located below the roller bearing 56. When the motor 20 operates, power from the motor 20 is transmitted to the second ring gear 52 and drives the latter to rotate, such that the housing 60 fixedly locked to the second ring gear 52 and a mixer shaft 70 connected to the lower cup portion 62 of the housing 60 are brought to rotate at the same time at a reduced rotational speed.

The housing-rotatable planetary gear reducer according to the present invention outputs power through the rotation of the housing 60. The two tapered roller bearings 35, 55 are respectively arranged at a highest and a lowest position of the housing 60 to serve as two support points, so that a relatively long distance is formed between the two support points. With this arrangement, the stand mixer consisting of the housing-rotatable planetary gear reducer and the mixer shaft 70 can bear relatively increased radial force and axial force. Therefore, parts and components like the long bearing support base 17 and the coupling 12 required in the conventional planetary gear reducer are no longer needed in the present invention to enable reduced number of parts and components, lowered manufacturing cost and decreased overall weight and volume of the housing-rotatable planetary gear reducer.

The housing-rotatable planetary gear reducer of the present invention only requires a dustproof device provided above the lubricant oil surface to prevent dust from getting into the planetary gear reducer. An oil seal 22 mounted between a top of the housing 60 and the locating flange 21 can achieve the dustproof effect. With the fully sealed housing 60, the housing-rotatable planetary gear reducer of the present invention is an oil-leakproof structure.

Figure 7:
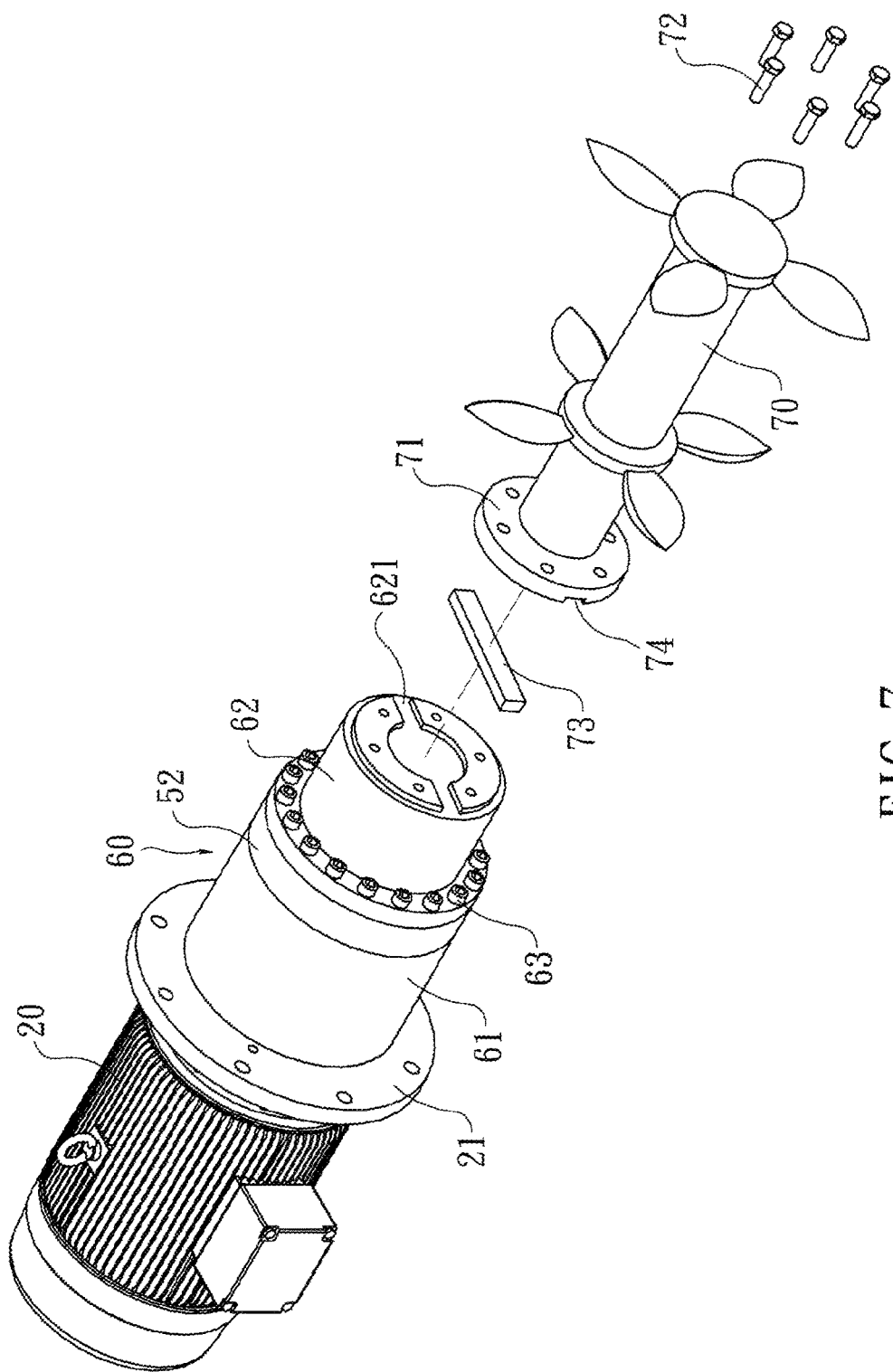
FIG. 7 is a partially exploded perspective view showing the housing-rotatable planetary gear reducer of the present invention and a mixer shaft to be mounted thereto.
Figure 8:
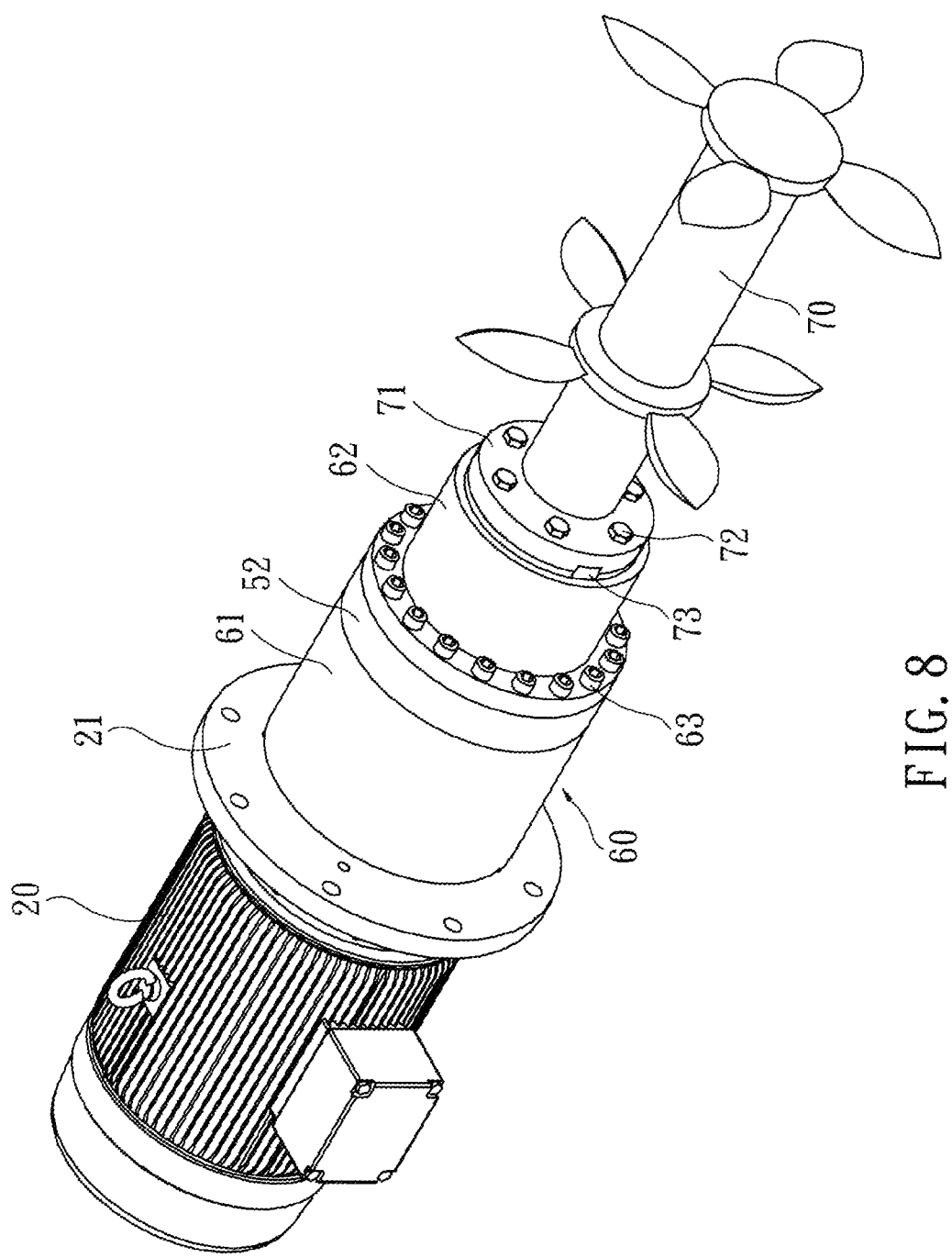
FIG. 8 is an assembled view of FIG. 7.

Please refer to FIGS. 7 and 8. The housing-rotatable planetary gear reducer with the mixer shaft 70 locked to the lower cup portion 62 of the housing 60 provides a stand mixer. A horizontal connecting plate 71 is provided on an upper end of the mixer shaft 70, such that the connecting plate 71 is in flat contact with a bottom surface of the lower cup portion 62 and is locked thereto by means of a plurality of screws 72. A flat key 73 is pressed between the bottom surface of the lower cup portion 62 of the housing 60 and the connecting plate 71 of the mixer shaft 70, such that an upper part of the flat key 73 is set in a receiving recess 621 preformed on the bottom surface of the lower cup portion 62 and a lower part of the flat key 73 is set in another receiving recess 74 preformed on a top surface of the connecting plate 71. Via the flat key 73, the housing 60 can bring the mixer shaft 70 to rotate along with it, and this arrangement largely reduces the shear force born by the screws 72.

In summary, the housing-rotatable planetary gear reducer for stand mixer according to the present invention is oil-leakproof and can be used with food and medicine mixers without the risk of contaminating the food or medicine materials being mixed due to an oil leak. In the present invention, the housing 60 for outputting power has a long distance formed between the upper and the lower support points thereof, i.e. the first and the second tapered roller bearing 35, 55, and can therefore maintain highly stable rotating. The advantages of good oil-leakproofness, no material contamination, stable power output, small volume, low weight and lowered manufacturing cost make the present invention novel and practical for use.

The present invention has been described with a preferred embodiment thereof and it is understood that many changes and modifications in the described embodiment can be carried out without departing from the scope and the spirit of the invention that is intended to be limited only by the appended claims.

What is claimed is:

1. A housing-rotatable planetary gear reducer for stand mixer comprising a locating flange, a first planetary gear set, a first sun gear, a second planetary gear set, a second sun gear and a housing; the first planetary gear set including a first ring gear fixedly connected to the locating flange to form an integral body; the first sun gear being driven by a motor to rotate and transmitting power to the first planetary gear set for the latter to rotate; the first planetary gear set transmitting power to and rotating the second planetary gear set via the second sun gear; and the housing being connectable to a mixer shaft; characterized in that:

the housing includes an upper barrel portion and a lower cup portion, and a second ring gear of the second planetary gear set is clamped to between the upper barrel portion and the lower cup portion; the upper barrel portion, the second ring gear and the lower cup portion are sequentially locked together by means of a plurality of screws; and sealants are applied to a joint of the upper barrel portion and the second ring gear as well as a joint of the second ring gear and the lower cup portion; and that a second planetary carrier of the second planetary gear set is fixedly mounted to a connecting plate, which is further fixedly connected to the first ring gear of the first planetary gear set to form an integral body; and an extended shaft is connected to a bottom center of the second planetary carrier; and that a first tapered roller bearing is disposed between the upper barrel portion of the housing and the first ring gear of the first planetary gear set; a second tapered roller bearing is disposed between the lower cup portion of the housing and the extended shaft at the bottom center of the second planetary carrier; and an oil seal is mounted between a top of the housing and the locating flange; and wherein when the motor operates, power from it is transmitted to the second ring gear, which is fixedly connected to the housing, such that the housing is brought to rotate along with the second ring gear at a reduced rotational speed.

2. The housing-rotatable planetary gear reducer for stand mixer as claimed in claim 1, further comprising a roller bearing, which is disposed between the lower cup portion of the housing and the extended shaft at the bottom center of the second planetary carrier and located above the second tapered roller bearing.

3. The housing-rotatable planetary gear reducer for stand mixer as claimed in claim 1, wherein the mixer shaft has a horizontal connecting plate provided on an upper end thereof; and the horizontal connecting plate being in flat contact with a bottom surface of the lower cup portion of the housing and being fixedly locked thereto by means of another plurality of screws.

4. The housing-rotatable planetary gear reducer for stand mixer as claimed in claim 3, further comprising a flat key clamped to between the bottom surface of the lower cup portion of the housing and the horizontal connecting plate of the mixer shaft; such that an upper part of the flat key is set in a receiving recess preformed on the bottom surface of the lower cup portion and a lower part of the flat key is set in another receiving recess preformed on a top surface of the horizontal connecting plate of the mixer shaft.

* * * * *